United States Patent Office 2,742,349
Patented Apr. 17, 1956

2,742,349

SYNERGISTIC STABILIZING COMPOSITIONS

James B. McCoy, Detroit, Mich., assignor to Ethyl Corporation, New York, N. Y., a corporation of Delaware No Drawing. Application February 25, 1952,
Serial No. 273,341

5 Claims. (Cl. 44—63)

This invention relates to the stabilization of organic materials normally susceptible to deterioration. More particularly my invention relates to the inhibition of attack by oxygen and the prolongation of the useful life of oxygen-sensitive materials.

Hydrocarbon fuels for internal combustion engines may be broadly classified into three categories, according to the use for which they are intended; fuels for automotive spark ignition engines, fuels for aircraft spark ignition engines, and fuels for compression ignition engines. Although each such fuel is composed essentially of hydrocarbons, the stability characteristics during the manufacturing process and subsequent storage and use, particularly in the presence of oxygen, differs considerably for each type. For example, typical automotive fuels contain straight and branched chain aliphatics, olefins, naphthenes and some aromatics, while typical aircraft fuels contain smaller proportion of olefins. In recent years fuels for compression ignition engines have contained an increased proportion of cracked stocks, resulting in a higher olefin content and consequent increase in the susceptibility to gum formation. The effect of the deterioration of the fuel upon each type of engine may differ, but equivalent processes of deterioration occur in each fuel. For example, the formation of gum in fuels designed for use in spark ignition engines interferes with normal operation of the ignition system and valves, while the formation of such gummy materials in compression ignition engine fuels interferes with the normal operation of the fuel filters and injectors in such engines.

In general, the hydrocarbons present in automotive gasolines are more susceptible to degradation than those comprising aircraft fuels. However, both automotive and aircraft fuels are commonly blended with tetraethyllead before use. Such blending imposes a further point of instability in the finished fuel, since the tetraethyllead is susceptible to some deterioration by contact with oxygen during the blending, storage and handling operations, with consequent formation of haze, loss of some antiknock value, and lessened performance in the engine. This point of attack is often overlooked and is ordinarily unimportant in automotive fuels, as the protective measures necessary for the base stock are usually more than sufficient to protect the tetraethyllead. If, however, a stabilizing ingredient were added which is capable of protecting only the fuel, the attack upon the tetraethyllead would then become apparent. In aircraft fuels the protection must center upon the antiknock additive, as the fuel itself is relatively stable. Furthermore, this phase of the problem becomes relatively more important in aircraft fuels, since the tetraethyllead content of such fuels is generally several times that present in automotive fuels.

Heretofore, the protection of fuels for internal combustion engines effectively against the two above-described separate but related deleterious effects of contact with oxygen during the refining, manufacture, blending, storage and handling operations has been accomplished only with difficulty. Furthermore, because of the specifications imposed on such fuels by the rigid requirements of present day engines, particularly aircraft engines, it is essential that any material used to protect such fuels against deterioration be effective in extremely small quantities, on the order of one pound of additive per five thousand gallons of fuel, so that secondary problems do not arise through their use.

Similarly, synthetic and natural elastomers are susceptible to absorption of oxygen with consequent destruction of certain useful physical properties and with the introduction of certain properties which render articles manufactured from such elastomers of limited utility. By absorption of oxygen such elastomers deteriorate prematurely, lose tensile strength and flexibility, and become discolored and embrittled. While certain materials have been proposed for the protection of such elastomers from the deleterious action of oxygen, most of such protective substances, as for example β-naphthol, possess the serious disadvantage, particularly with respect to light colored stocks, that their own degradation products are themselves colored and hence interfere with the color fastness of the stocks being protected.

Further examples of materials which must be protected from the deleterious effects of oxygen include mineral oils, such as lubricating oils, soaps, certain perishable foodstuffs, such as animal and vegetable oils and fats, and synthetic unsaturated organic materials. In general, such organic substances may require protection at any time during the processes of manufacturing, handling, storage and use when they become exposed to and absorb oxygen with deleterious effects.

It is therefore an object of my invention to provide compositions effective in protecting such organic substances which deteriorate in or are affected adversely by oxygen. It is a further object of my invention to provide a class of mixtures which provides the required protection against the formation of gummy oxidation and polymerization products of unstable hydrocarbons on contact with oxygen at reduced levels of additive. Another object of my invention is to provide means for increased stabilization of hydrocarbon fuels for internal combustion spark, and compression ignition engines during the manufacturing, handling and storage of such fuels prior to their use without increasing the total amount of stabilizing additive. Likewise, it is an object of this invention to provide means for reducing the antioxidant requirement of unstable organic materials. A still further object is to provide hydrocarbon fuels containing tetraethyllead which do not deteriorate in contact with oxygen with the resultant formation of gum, haze and tetraethyllead oxidation products. It is also an object of this invention to provide fuels containing tetraethyllead in which there is essentially no loss in performance characteristics due to such deterioration of the tetraethyllead during blending, storage and handling. Likewise, it is an object of my invention to provide means for preventing embrittlement, discoloration, loss of tensile strength and other harmful effects in elastomers during the milling, compounding, fabrication, storage, handling and use of such elastomer stocks. A further object of the invention is to provide means for protecting other perishable natural or synthetic organic materials from the adverse effects of contact with oxygen. Still further objects of my invention will appear from the description of the invention as hereinafter disclosed.

The above objects can be accomplished by practicing my invention which comprises providing, for admixture with materials, a composition comprising arylamine antioxidants and substances derived from the class of piperazines.

I have made the discovery that piperazines, themselves incapable of protecting effectively organic materials from deterioration in the presence of oxygen, have the property of greatly increasing the effectiveness of previously known antioxidants of the arylamine type. Such piperazines I refer to hereinafter as synergists. This property is possessed by piperazine itself as well as N-substituted piperazine. In particular the piperazine synergists of my invention can be substituted on one or both nitrogen atoms with certain organic groups. Among such groups I can employ alkyl, alkenyl, cycloalkyl, aryl and substituted derivatives thereof as well as carbalkoxy groups. Among the hydrocarbon radicals which I have found to be effective substituents of the piperazine synergists of my invention are for example, methyl, ethyl, propyl, isopropyl, amyl, iso-amyl, ter.-amyl, hexyl, 2-methylhexyl, dodecyl, stearyl, allyl, crotyl, phytyl, oleyl, phenyl, α-naphthyl, β-naphthyl, tolyl, xylyl, benzyl, β-phenethyl, and the like. Typical examples of the carbalkoxy groups which I can employ include carbethoxy, carbopropoxy, carbomethoxy, carbobutoxy, carbisopropoxy and the like. Thus, I provide N-, and N,N'-substituted piperazine synergists. Furthermore, in that embodiment of my invention wherein both nitrogen atoms are substituted, such substituents can be mixed, that is I can employ, for example, N-alkyl-N'-aryl-piperazines, N-alkaryl-N'-carbalkoxy piperazines, N-alkenyl-N'-aryl piperazines, N-carbalkoxy-N'-aryl piperazines, N-aralkyl-N'-alkenyl piperazines and the like.

I have found that the replacement of a portion of the arylamine antioxidant of a stabilized composition with an equal weight of my synergistic piperazines, themselves incapable of providing oxygen stabilization, results in a stabilized composition which is more resistant to attack by oxygen. Furthermore, to attain a specified degree of oxygen stability the required amount of arylamine-piperazine mixture is less than the required amount of the arylamine antioxidants alone. Typical of the arylamine antioxidants which are activated by my piperazine synergists include N-N'-di-sec.-butyl-p-phenylenediamine, N-n-butyl-p-aminophenol, N-isobutyl-p-aminophenol, N,N'-di-α-naphthyl-p-phenylenediamine, N,N'-di-isopropyl-p-phenylenediamine, N-phenyl-β-naphthylamine and the like.

The absorption of oxygen by hydrocarbon fuels can be measured directly by the standard method of the American Society of Testing Materials for determination of the oxidation stability of gasoline (induction period method), ASTM designation: D525–46, as fully described in part III–A, ASTM Standards for 1946. According to this method the induction period is the period during which there is no absorption of oxygen by the test material as indicated by a drop in pressure, when placed in a testing bomb maintained at a temperature of 100° C. with an initial pressure of 100 pounds per square inch gauge of oxygen. The induction period increase (IPI) is the increase in the duration of this period caused by the addition of a protective substance, and is a direct measure of the protection afforded by such additive. Thus, the longer the IPI the more effective is the stabilizer. On the contrary, certain substances exert a pro-oxidant effect in which a negative IPI is obtained, that is, the duration of the induction period, or period of no absorption of oxygen, is less than in the absence of the additive. To obtain the results shown herein, 6 milligrams of the additive was dissolved in 100 milliliters of the gasoline. Where the solubility characteristics of the material were such that this concentration could not be obtained, a small amount of a solubilizing agent, such as ethyl or isopropyl alcohol, was added in amount up to 2 per cent of the gasoline.

TABLE I

*Effect on induction period increase of gasolines*

| Synergist | IPI |
|---|---|
| Piperazine | 20 |
| N-Hexyl piperazine | 5 |
| N,N'-Diphenyl piperazine | −15 |
| N-Phenyl piperazine | 5 |
| N,N'-Dicarbethoxy piperazine | 5 |

From Table I it is clear that the synergizing components of the antioxidant mixtures of our invention are essentially inert or act as pro-oxidants. Other piperazines of my invention which do not exhibit an antioxidant effect when employed alone in gasoline include N-methyl piperazine, N-ethyl piperazine, N-(β-chloroethyl) piperazine, N-(β-hydroxyethyl) piperazine, N-octyl-N'-methyl piperazine, N-dodecyl-N'-phenyl piperazine, N-(o-tolyl)-N'-carbethoxy piperazine, N-carbisopropoxy-N'-allyl piperazine, N-benzyl-N'-crotyl piperazine, N,N'-dimethyl piperazine, N,N'-diisobutyl piperazine, N,N'-dilauryl piperazine, N,N'-di-(p-chlorophenyl) piperazine, N,N'-ditolyl piperazine, N-benzyl piperazine and the like.

The effectiveness of the piperazines of my invention as synergists is typified in Table II, wherein the piperazines were added to the test gasoline in admixture with N,N'-di-sec.-butyl-p-phenylenediamine. I have listed in Table II the increase in the induction period of the so-treated gasoline at a total concentration of 6 milligrams of the mixture per 100 milliliters of gasoline. In each case this mixture contained 33 weight per cent of the piperazine and 67 weight per cent of N,N'-di-sec.-butyl-p-phenylenediamine. Also shown is the increase in the induction period of the test gasoline treated with the arylamine antioxidant alone at the same concentration of 4 milligrams per 100 milliliters of gasoline.

TABLE II

*Effect on induction period increase of gasoline*

| No. | Synergist | IPI with 4 mg./100 ml. of antioxidant, no synergist | IPI with 6 mg./100 ml. of synergistic mixture | Increase in IPI effected by synergistic component |
|---|---|---|---|---|
| 1 | Piperazine | 460 | 590 | 130 |
| 2 | N-Hexyl piperazine | 460 | 570 | 110 |
| 3 | N-Phenyl piperazine | 460 | 845 | 385 |
| 4 | N,N'-Dicarbethoxy piperazine | 460 | 575 | 115 |

Mixtures of the piperazine synergists of my invention when employed along with known arylamine rubber antioxidants likewise provide protection to such rubber stocks. This can be determined by measuring the degree to which a test piece so compounded retains its elasticity after being subjected to accelerated aging according to the procedure of ASTM designation D-572-42, for a period of 96 hours at a temperature of 70° C. in the presence of oxygen pressure initially at 300 pounds per square inch gauge. By determining both the tensile strength and ultimate elongation of such test pieces it is found that my piperazine synergists greatly improve the functioning of arylamine antioxidants and overcome some of their inherent disadvantages, such as migration and bleeding.

The quantities of the mixtures of my invention incorporated in the materials to be stabilized are not critical and depend largely upon the type of material being stabilized and the conditions under which the exposure to oxygen occurs. For example, with gasolines, tetraethyllead, mineral oils and similar materials the mixtures of my invention are preferably employed in concentrations between the limits of approximately 0.1 and 15 milligrams per 100 milliliters of material to be stabilized. For other materials, such as for example elastomers, both natural and synthetic, somewhat larger amounts of the stabilizers of my invention are preferred and can be tolerated. Thus, in such materials I employ between approximately 0.1 and 2 parts of synergistic mixture per 100 parts of oxidizable material. Thus, my mixtures can be satisfactorily employed in a wide range of concentrations, and I do not intend that my invention be restricted to the specific quantities mentioned herein.

Furthermore, I do not mean to be restricted by the ratios of synergistic piperazine to arylamine antioxidant employed in the specific embodiments of my invention disclosed herein by way of examples. Such ratios will be determined in part by the nature of the material to be stabilized, in part by the specific arylamine employed and in part by the specific synergistic piperazine. In general, however, I prefer to employ between about 30 and 100 parts by weight of piperazine to 100 parts by weight of arylamine.

I have disclosed a number of preferred embodiments of my invention and illustrated several means whereby protection can be afforded to organic materials sensitive to attack by oxygen. My invention is not intended to be limited to the specific embodiments of my invention herein or to the means described herein for obtaining the advantages possible in employing my synergistic mixtures, as other methods of practicing my invention will be apparent to those skilled in the art.

I claim:

1. Gasoline normally tending to deteriorate in the presence of oxygen containing, in amount sufficient to inhibit such deterioration, a small antioxidant quantity of a mixture of (1) a material selected from the group consisting of piperazine and piperazine substituted on at least one nitrogen atom with a radical selected from the group consisting of hydrocarbon groups and carbalkoxy groups, and (2) N,N'-di-sec-butyl-p-phenylenediamine, said material being present in said mixture in amount between about 30 to 100 parts by weight per 100 parts by weight of said N,N'-di-sec-butyl-p-phenylenediamine.

2. The gasoline composition of claim 1 wherein said material is piperazine.

3. The gasoline composition of claim 1 wherein said material is N-hexyl piperazine.

4. The gasoline composition of claim 1 wherein said material is N-phenyl piperazine.

5. The gasoline composition of claim 1 wherein said material is N,N'-dicarbethoxy piperazine.

References Cited in the file of this patent

UNITED STATES PATENTS

| Number | Name | Date |
|---|---|---|
| 1,725,564 | Calcott et al. | Aug. 20, 1929 |
| 1,822,108 | Murrill | Sept. 8, 1931 |
| 1,968,914 | Semon | Aug. 7, 1934 |
| 1,973,676 | Voorhees | Sept. 11, 1934 |
| 2,094,367 | Missbach | Sept. 28, 1937 |
| 2,316,587 | Irigai | Apr. 13, 1943 |
| 2,324,278 | Chittum et al. | July 13, 1943 |
| 2,496,930 | Brimer | Feb. 7, 1950 |